(12) United States Patent
Ramo et al.

(10) Patent No.: US 12,081,963 B2
(45) Date of Patent: Sep. 3, 2024

(54) APPARATUS, METHOD AND COMPUTER PROGRAM FOR REPRESENTING A SOUND SPACE

(71) Applicant: Nokia Technologies Oy, Espoo (FI)

(72) Inventors: Anssi Ramo, Tampere (FI); Henri Toukomaa, Tampere (FI); Antti Johannes Eronen, Tampere (FI); Lasse Laaksonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 701 days.

(21) Appl. No.: 17/262,025

(22) PCT Filed: Jul. 19, 2019

(86) PCT No.: PCT/FI2019/050553
§ 371 (c)(1),
(2) Date: Jan. 21, 2021

(87) PCT Pub. No.: WO2020/021161
PCT Pub. Date: Jan. 30, 2020

(65) Prior Publication Data
US 2021/0314723 A1    Oct. 7, 2021

(30) Foreign Application Priority Data
Jul. 25, 2018    (GB) .................................... 1812134

(51) Int. Cl.
*H04S 7/00*    (2006.01)
*G06T 3/4038*    (2024.01)
(Continued)

(52) U.S. Cl.
CPC ............ *H04S 7/303* (2013.01); *G06T 3/4038* (2013.01); *G06T 9/00* (2013.01); *G06T 11/001* (2013.01); *H04S 2400/15* (2013.01)

(58) Field of Classification Search
CPC ...... H04S 7/303; H04S 2400/15; H04S 7/305; H04S 7/307; H04S 2400/11;
(Continued)

(56) References Cited

U.S. PATENT DOCUMENTS 8,665,321 B2 * 3/2014 Choi ................... H04N 21/4394
348/54
8,774,953 B2 * 7/2014 Yuasa .................... H04N 5/602
84/673
(Continued)

OTHER PUBLICATIONS

Deleflie, Etienne, et al., "Images as spatial sound maps", 2010 Conference on New Interfaces for Musical Expression (NIME2010), Sydney, Australia, pp. 130-135.
(Continued)

*Primary Examiner* — Xu Mei
(74) *Attorney, Agent, or Firm* — Harrington & Smith (57) ABSTRACT

The application relates to an apparatus, method and computer program for representing a sound space for use in mediated reality applications. The apparatus including circuitry configured for: obtaining one or more values for one or more acoustic parameters for a plurality of locations within a sound space; and generating an image file representing the sound space where an intensity value for a pixel represents the value for an acoustic parameter at a location corresponding to the pixel such that the data in the image file enables the sound space to be rendered.

20 Claims, 6 Drawing Sheets

(51) Int. Cl.
*G06T 9/00* (2006.01)
*G06T 11/00* (2006.01)

(58) Field of Classification Search
CPC ..... H04S 2420/07; H04S 7/40; G06T 3/4038;
G06T 9/00; G06T 11/001; A63F 13/54;
A63F 13/60; G11B 27/10; G01S 15/89;
H04R 29/008
See application file for complete search history.

(56) References Cited

U.S. PATENT DOCUMENTS

| | | | |
|---|---|---|---|
| 2005/0201565 A1* | 9/2005 | Choi | G06F 3/167 |
| | | | 381/61 |
| 2006/0132714 A1* | 6/2006 | Nease | G10H 1/0025 |
| | | | 352/244 |
| 2010/0232635 A1* | 9/2010 | Miyazaki | H04S 7/307 |
| | | | 381/332 |
| 2010/0303288 A1* | 12/2010 | Malone | H04N 5/76 |
| | | | 704/235 |
| 2010/0310094 A1* | 12/2010 | Lee | G09G 3/3233 |
| | | | 345/55 |
| 2012/0284619 A1 | 11/2012 | Myllyla et al. | 715/716 |
| 2014/0100839 A1* | 4/2014 | Arendash | G06F 30/20 |
| | | | 381/98 |
| 2017/0060880 A1 | 3/2017 | Sabin | |

OTHER PUBLICATIONS

Skodras, Athanassios, et al., "The JPEG 2000 Still Image Compression Standard", © 2001 IEEE, pp. 36-58.

* cited by examiner

APPARATUS, METHOD AND COMPUTER PROGRAM FOR REPRESENTING A SOUND SPACE

CROSS REFERENCE TO RELATED APPLICATION

This patent application is a U.S. National Stage application of International Patent Application Number PCT/FI2019/050553 filed Jul. 19, 2019, which is hereby incorporated by reference in its entirety, and claims priority to GB 1812134.3 filed Jul. 25, 2018.

TECHNOLOGICAL FIELD

Examples of the present disclosure relate to an apparatus, method and computer program for representing a sound space. Some relate to an apparatus, method and computer program for representing a sound space for use in mediated reality applications.

BACKGROUND

Sound spaces may be recorded and rendered in any applications where spatial audio is used. For example the sound spaces may be recorded for use in mediated reality content applications such as virtual reality or augmented reality applications. The sound space may contain a plurality of acoustic parameters for the different locations within the sound space. The acoustic parameters may comprise information which enables the spatial properties of the sound space to be recreated.

BRIEF SUMMARY

According to various, but not necessarily all, examples of the disclosure there is provided an apparatus comprising means for: obtaining one or more values for one or more acoustic parameters for a plurality of locations within a sound space; and generating an image file representing the sound space where an intensity value for a pixel represents the value for an acoustic parameter at a location corresponding to the pixel such that the data in the image file enables the sound space to be rendered.

The means may be for compressing the image file using at least one image compression process.

A plurality of representations of the sound space may be combined in a single image file wherein different representations relate to different acoustic parameters. The plurality of representations may be provided in a tiled format. The plurality of representations may be provided in a video format.

The image file may comprise a grey scale image.

The image file may comprises a coloured image and different colour channels may be used to represent different acoustic parameters.

The acoustic parameters may comprise any one or more of, reverberation, audio decay time, arrival time of reflection, horizontal arrival direction of reflection, vertical arrival direction of reflection, relative level of reflection, diffuseness, equalization, direct sound level, direct sound position, late delay, early reflection latency.

The means may be for associating mapping data with the image file wherein the mapping data comprises information that enables the image file to be converted to one or more values for one or more acoustic parameters.

An image file may be obtained for different heights of the sound space.

The sound space may be a virtual sound space.

According to various, but not necessarily all, examples of the disclosure there is provided an apparatus comprising processing circuitry; and memory circuitry including computer program code, the memory circuitry and the computer program code configured to, with the processing circuitry, cause the apparatus to: obtaining one or more values for one or more acoustic parameters for a plurality of locations within a sound space; and generating an image file representing the sound space where an intensity value for a pixel represents the value for an acoustic parameter at a location corresponding to the pixel such that the data in the image file enables the sound space to be rendered.

According to various, but not necessarily all, examples of the disclosure there is provided a computer device comprising an apparatus as described above and one or more transceivers configured to transmit the image file to an audio rendering device.

According to various, but not necessarily all, examples of the disclosure there is provided a method comprising: obtaining one or more values for one or more acoustic parameters for a plurality of locations within a sound space; and generating an image file representing the sound space where an intensity value for a pixel represents the value for an acoustic parameter at a location corresponding to the pixel.

In some examples the method may comprise compressing the image file using at least one image compression process.

According to various, but not necessarily all, examples of the disclosure there is provided a computer program comprising computer program instructions that, when executed by processing circuitry, cause: obtaining one or more values for one or more acoustic parameters for a plurality of locations within a sound space; and generating an image file representing the sound space where an intensity value for a pixel represents the value for an acoustic parameter at a location corresponding to the pixel.

BRIEF DESCRIPTION

Some example embodiments will now be described with reference to the accompanying drawings in which.

DEFINITIONS

A sound space refers to an arrangement of sound sources in a three-dimensional space. A sound space may be defined in relation to recording sounds (a recorded sound space) and in relation to rendering sounds (a rendered sound space). The rendered sound space may enable a user to perceive the arrangement of the sound sources as though they have been recreated in a virtual three-dimensional space. The rendered sound space therefore provides a virtual space that enables a user to perceive spatial sound.

A sound scene refers to a representation of the sound space listened to from a particular point of view within the sound space. For example a user may hear different sound scenes as they rotate their head or make other movements within a sound space.

A sound object refers to a sound source that may be located within the sound space. A source sound object represents a sound source within the sound space. A recorded sound object represents sounds recorded at a particular microphone or position. A rendered sound object represents sounds rendered from a particular position.

Mediated reality content refers to virtual content which enables a user to experience a fully or partially artificial environment. The artificial environment could be experienced audibly and/or visually. For instance, the mediated reality content could include interactive content such as a video game or non-interactive content such as motion video.

In some examples the mediated reality content could comprise augmented reality content which enables a user to experience a partially artificial environment. In some examples the mediated reality content could comprise virtual reality content which enables a user to experience a fully artificial environment.

DETAILED DESCRIPTION

The FIGS. illustrate an apparatus 101 comprising means for: obtaining 301 one or more values for one or more acoustic parameters for a plurality of locations within a sound space; and generating 303 an image file representing the sound space where an intensity value for a pixel represents the value for an acoustic parameter at a location corresponding to the pixel such that the data in the image file enables the sound space to be rendered. This provides the technical effect of enabling image compression techniques to be used to compress the file representing the acoustic parameters. This enables the data to be stored and/or transmitted more efficiently. This can enable a plurality of different acoustic parameters within a sound space to be stored so as to enable a realistic sound space to be audibly rendered for a user.

The apparatus 101 may be for recording and/or processing captured audio signals.

Figure 1:
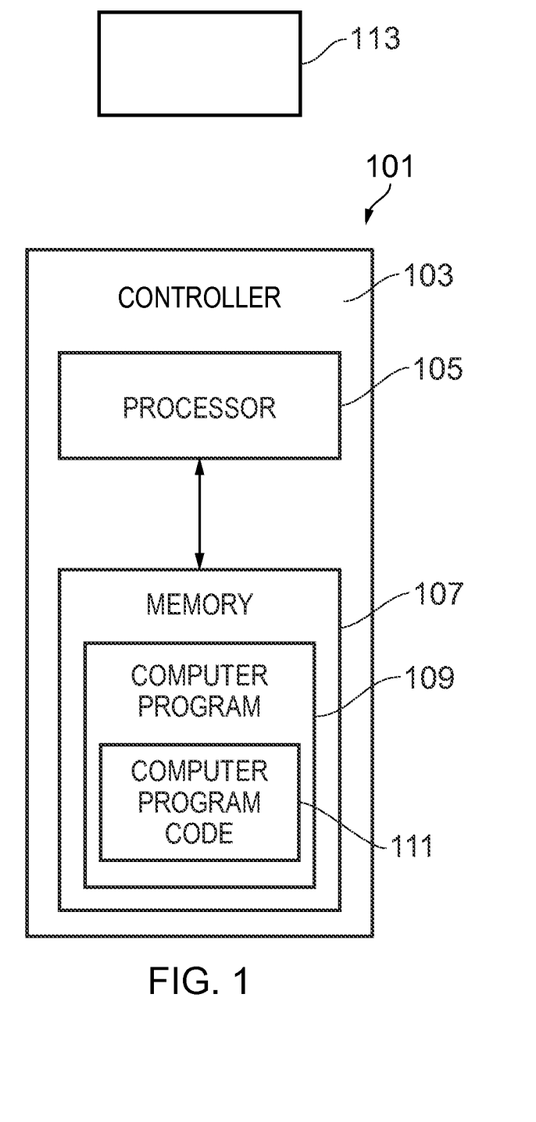
FIG. 1 illustrates an example apparatus.

FIG. 1 schematically illustrates an apparatus 101 according to examples of the disclosure. The apparatus 101 illustrated in FIG. 1 may be a chip or a chip-set. In some examples the apparatus 101 may be provided within devices such as a processing device. In some examples the apparatus 101 may be provided within an audio capture device or an audio rendering device.

In the example of FIG. 1 the apparatus 101 comprises a controller 103. In the example of FIG. 1 the implementation of the controller 103 may be as controller circuitry. In some examples the controller 103 may be implemented in hardware alone, have certain aspects in software including firmware alone or can be a combination of hardware and software (including firmware).

As illustrated in FIG. 1 the controller 103 may be implemented using instructions that enable hardware functionality, for example, by using executable instructions of a computer program 109 in a general-purpose or special-purpose processor 105 that may be stored on a computer readable storage medium (disk, memory etc) to be executed by such a processor 105.

The processor 105 is configured to read from and write to the memory 107. The processor 105 may also comprise an output interface via which data and/or commands are output by the processor 105 and an input interface via which data and/or commands are input to the processor 105.

The memory 107 is configured to store a computer program 109 comprising computer program instructions (computer program code 111) that controls the operation of the apparatus 101 when loaded into the processor 105. The computer program instructions, of the computer program 109, provide the logic and routines that enables the apparatus 101 to perform the methods illustrated in FIG. 3 The processor 105 by reading the memory 107 is able to load and execute the computer program 109.

The apparatus 101 therefore comprises: at least one processor 105; and at least one memory 107 including computer program code 111, the at least one memory 107 and the computer program code 111 configured to, with the at least one processor 105, cause the apparatus 101 at least to perform: obtaining 301 one or more values for one or more acoustic parameters for a plurality of locations within a sound space; and generating 303 an image file representing the sound space where an intensity value for a pixel represents the value for an acoustic parameter at a location corresponding to the pixel such that the data in the image file enables the sound space to be rendered.

As illustrated in FIG. 1 the computer program 109 may arrive at the apparatus 101 via any suitable delivery mechanism 113. The delivery mechanism 113 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 109. The delivery mechanism may be a signal configured to reliably transfer the computer program 109. The apparatus 101 may propagate or transmit the computer program 109 as a computer data signal. In some examples the computer program 109 may be transmitted to the apparatus 101 using a wireless protocol such as Bluetooth, Bluetooth Low Energy, Bluetooth Smart, 6LoWPan (IPV6 over low power personal area networks) ZigBee, ANT+, near field communication (NFC), Radio frequency identification, wireless local area network (wireless LAN) or any other suitable protocol.

The computer program 109 comprises computer program instructions for causing an apparatus 101 to perform at least the following: obtaining 301 one or more values for one or more acoustic parameters for a plurality of locations within a sound space; and generating 303 an image file representing the sound space where an intensity value for a pixel represents the value for an acoustic parameter at a location corresponding to the pixel such that the data in the image file enables the sound space to be rendered.

The computer program instructions may be comprised in a computer program 109, a non-transitory computer readable medium, a computer program product, a machine readable medium. In some but not necessarily all examples, the computer program instructions may be distributed over more than one computer program 109.

Although the memory 107 is illustrated as a single component/circuitry it may be implemented as one or more separate components/circuitry some or all of which may be integrated/removable and/or may provide permanent/semi-permanent/dynamic/cached storage.

Although the processor 105 is illustrated as a single component/circuitry it may be implemented as one or more separate components/circuitry some or all of which may be integrated/removable. The processor 105 may be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" may refer to one or more or all of the following:
(a) hardware-only circuitry implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Figure 2:
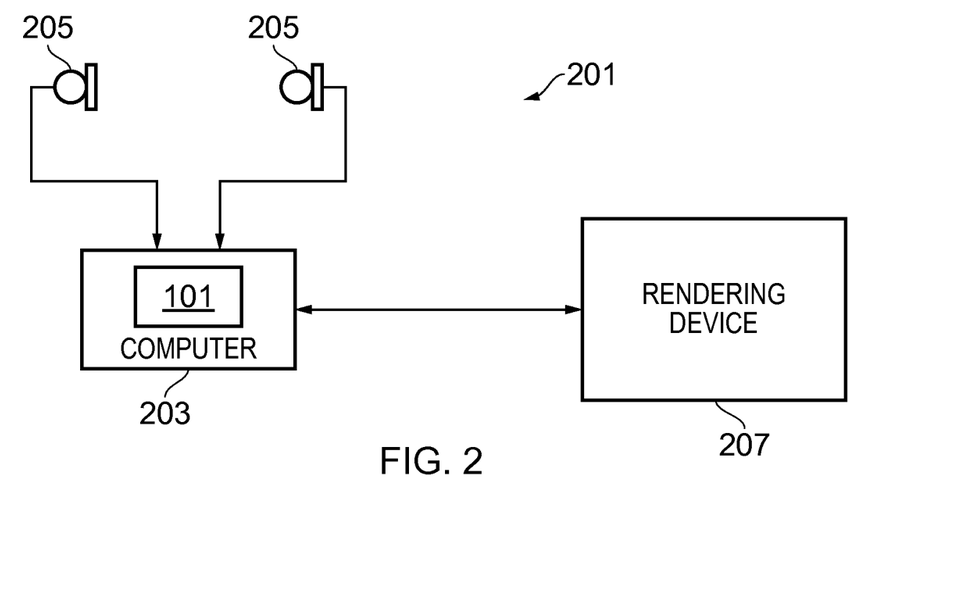
FIG. 2 illustrates an example system.

FIG. 2 illustrates an example system 201 that could be used to implement examples of the disclosure. The system 201 comprises a plurality of microphones 205, a computer 203 and a rendering device 207. It is to be appreciated that only the components referred to in the following description are shown in FIG. 2 and that the system 201 could comprise additional components in other implementations.

The plurality of microphones 205 comprise any suitable means which may be configured to convert a detected audio signal into a corresponding electrical signal. The plurality of microphones 205 may be spatially distributed so as to enable a sound space to be captured and recorded. In some examples the plurality of microphones 205 may comprise a microphone array. The microphone array comprises a plurality of spatially separated microphones which may be arranged to capture spatial audio signals. In some examples the microphones 205 could comprise lavalier microphones or any other suitable type of microphones that could be provided in addition to the microphone array. The microphones 205 may be located at different locations within a space so as to enable a sound space to be captured and recorded.

The microphones 205 are coupled to a computer 203 so that the electrical signals from the microphones 205 are provided to the computer 203.

The computer 203 comprises an apparatus 101 which may be as shown in FIG. 1. The apparatus 101 may be configured to obtain acoustic parameters from the electrical signals provided by the microphones 205. For example, the apparatus 101 may be configured to process the electrical signals from the microphones 205 to determine the acoustic parameters. The acoustic parameters comprise information which enables the spatial properties of the audio signals to be recreated. The acoustic parameters comprise information which enables the sound space to be recreated. The acoustic parameters may be obtained for different locations within the sound space. The acoustic parameters could comprise any one or more of, reverberation, audio decay time, arrival time of reflection, horizontal arrival direction of reflection, vertical arrival direction of reflection, relative level of reflection, diffuseness, equalization, direct sound level, direct sound position, late delay, early reflection latency or any other suitable parameters.

The computer 203 is coupled to a rendering device 207 so as to enable the acoustic parameters that are obtained by the computer to be provided to the rendering device 207. The computer 203 may comprise one or more transceivers to enable the acoustic parameters to be transmitted to the rendering device 207.

The rendering device 207 may comprise an audio rendering device. The rendering device 207 comprises any means which may be arranged to convert electrical input signals into audio output signals. In some examples the rendering device 207 comprises a head set or head phones. In some examples the rendering device 207 could comprise one or more loudspeakers. The rendering device 207 may be configured to enable the sound space to be audibly rendered for the user.

The rendering device 207 could be configured to enable the user to move through the sound space. This would enable the user to hear different sound scenes as they move through the sound space. In some examples the rendering device 207 may enable the user to move with six degrees of freedom. In such examples, the user could move along three perpendicular axis and also rotate about each of the axis.

The rendering device 207 may be configured to obtain the acoustic parameters from the computer and use the acoustic parameters to render the sound space for the user. The sound scene that is rendered to the user may be determined by the user's location and orientation within a space corresponding to the sound space.

In order to enable the different sounds scenes to recreated different acoustic parameters for the different locations within the sound space are obtained. In order to recreate a realistic sound space this may require a very large amount of data. The apparatus 101 may be configured to generate an image file using the method of FIG. 3 so as to reduce the size of the data file containing the acoustic parameters.

Figure 3:
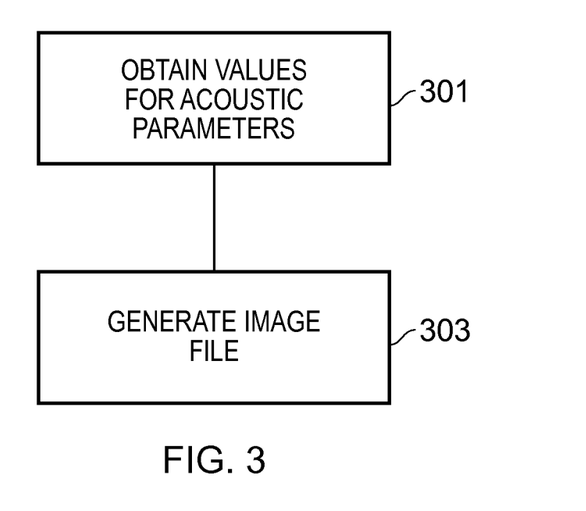
FIG. 3 illustrates an example method.

FIG. 3 illustrates an example method which could be implemented using the example apparatus 101 and system 201 shown in FIGS. 1 and 2.

The method comprises, at block 301, obtaining one or more values for one or more acoustic parameters for a plurality of locations within a sound space.

The sound space may be a virtual sound space. The sound space could be captured and recorded by a plurality of microphones 205. In some examples the sound space could be artificially generated to correspond to a generated virtual space.

The sound space may be a three dimensional space. This may enable a user to move through the sound space. This may enable a user to move through the sound space with six degrees of freedom. The user may be able to rotate so as to change their angle of roll pitch and yaw and may also be able to move along three perpendicular axis.

The acoustic parameters may be obtained for a plurality of different locations within the sound space. The different locations could be different points in a horizontal plane. The different locations could also be different points in a vertical plane. This enables different sound scenes for the different locations and orientations of the user to be obtained.

Any suitable method may be used to obtain the acoustic parameters. In examples where the sound space represents a real environment the acoustic parameters could be measured. In examples where the sound space represents a virtual environment the acoustic parameters can be calculated using modelling processes or any other suitable techniques.

The acoustic parameters can comprise any information which enables the sound space to be audibly recreated. The acoustic parameters comprise information about how the sound scenes change for different locations and orientations within the sound space. The acoustic parameters comprise information about the spatial properties of the sounds within the sound space. In some examples the acoustic parameters comprise any one or more of, reverberation, audio decay time, arrival time of reflection, horizontal arrival direction of reflection, vertical arrival direction of reflection, relative level of reflection, diffuseness, equalization, direct sound level, direct sound position, late delay, early reflection latency or any other suitable parameters.

The acoustic parameters may be quantized. A numerical value may be assigned to the acoustic parameters for the locations within the sound space.

The sound space may comprise any suitable number of locations. The number of locations within the sound space may depend upon the size of the sound space, the size of the image file available and/or any other suitable factor. For instance, where the sound space represents a small room a 4×4 grid comprising sixteen locations could be used. Where the sound space represents a larger area a larger grid and number of locations may be used.

The method also comprises, at block 303, generating an image file representing the sound space where an intensity value for a pixel represents the value for an acoustic parameter at a location corresponding to the pixel. A grid or other means could be used to map the acoustic locations to pixels within the image file.

It is to be appreciated that an image generated by the image file does not need to visually represent the sound space. It is sufficient for the image file to represent the sound space by containing information which enables the spatial properties of the sound space to be recreated. For instance the sound space could have a different shape to the array of pixels in the image file, for instance the sound space could be rectangular while the pixels are arranged in a square array. In such examples the locations representing the sound space could be wrapped around in the pixels in the image file. This would result in an "image" that does not look like the sound space but which contains sufficient information to enable the sound space to be recreated.

In order to generate the image file the acoustic parameters can be given a numerical value. The numerical value can then be mapped to an intensity value for a pixel. The acoustic parameters can be mapped to pixels corresponding to the location of the acoustic parameters within the sound space. The intensity value could be the pixel value. For example, for an 8 bit image file the intensity value could be a number between 0 and 255. Other values could be used in other examples of the disclosure. This results in a data file which contains acoustic parameters for the different locations within the sound space. The image file comprises sufficient information to enable the sound space to be audibly rendered for a user of a rendering device 207.

The location corresponding to the pixel is the location in the sound space which has the acoustic parameters having a value as represented by the intensity of the pixel. In some examples the locations of the pixels could be aligned with the locations of the points in the sound space. For instance if the image of the image file is the same shape as the sound space then the locations in the sound space could be aligned with the locations of the pixels in the image file. In some examples the sound space could have a different shape to the image of the image file. In such examples metadata could be provided which indicates how the locations of the sound space are mapped to the pixels in the image file.

In some examples the image file could comprise a plurality of representations of the sound space. The different representations could be associated with different acoustic parameters. For example, a first representation could be associated with reverberation while a second representation could be associated with an arrival direction of reflection. Other acoustic parameters could be used in other examples. In some examples the different representations could be associated with the same acoustic parameter but for different frequency bands. The plurality of representations could be provided in a tiled format or a video format or any other suitable format.

Once the image file has been generated the image file can be compressed using one or more image compression processes. In some examples the image compression process could significantly reduce the size of the image file without losing the information stored in the image file. In some examples a lossy image and video compression method could be used to compress the image file even further. In such examples this would result in some loss of information however the compression can be such that the loss of information is insignificant and is not perceived when the audio signal is rendered. This could enable the image file representing the acoustic parameters to be transmitted and stored more easily while still enabling the sound space to be adequately rendered for a user.

Once the image file has been compressed it may be stored in a memory and/or transmitted to a rendering device 207. The rendering device 207 may process the image file to obtain the acoustic parameters for the locations within the sound space. The rendering device 207 can then use this to create the sound scenes for the user of the rendering device. The sound scenes comprise audible signals that are provided via the rendering device 207

In some examples the method may also comprise associating mapping data with the image file. The mapping data comprises information that enables the image file to be converted to one or more values for one or more acoustic parameters. For instance the mapping data could indicate the type of acoustic parameter or parameters that are represented by the image file, the scale of the acoustic parameter, whether the scale is linear or logarithmic or any other suitable information. This information helps the rendering device to be recreated the sound space for the user.

In some examples the sound space could also be associated with a visual space. For instance a virtual visual scene could be provided with the sound space to enable a user to experience a mediated reality both visually and audibly. In such examples the images representing the virtual visual scene are separate to and distinct from the image files representing the sound space. In implementations of the disclosure the image file representing the acoustic sound space is never rendered visually, instead it contains data that can be used to render an audible signal.

In some examples a plurality of different image files may be generated for different heights within the sound space. For instance, the sound space could be divided vertically into 10 cm blocks and different image files could be generated for each of the different 10 cm blocks.

This may enable the sound space to be realistically recreated as a user changes their height, for example if a user moves from a sitting position to a standing position.

Figure 4A:
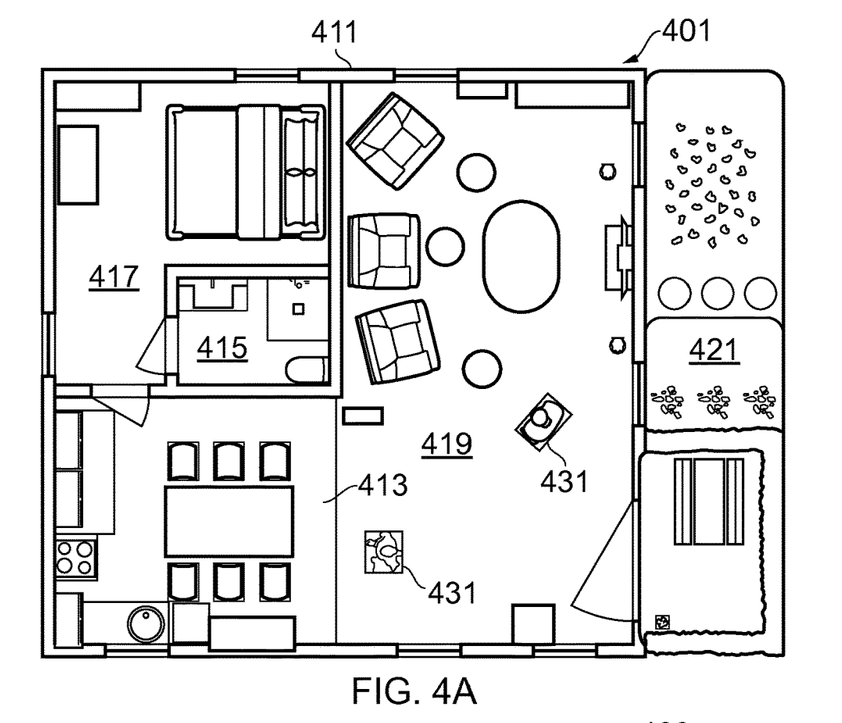
FIGS. 4A and 4B illustrate an example space and sound space.
Figure 4B:
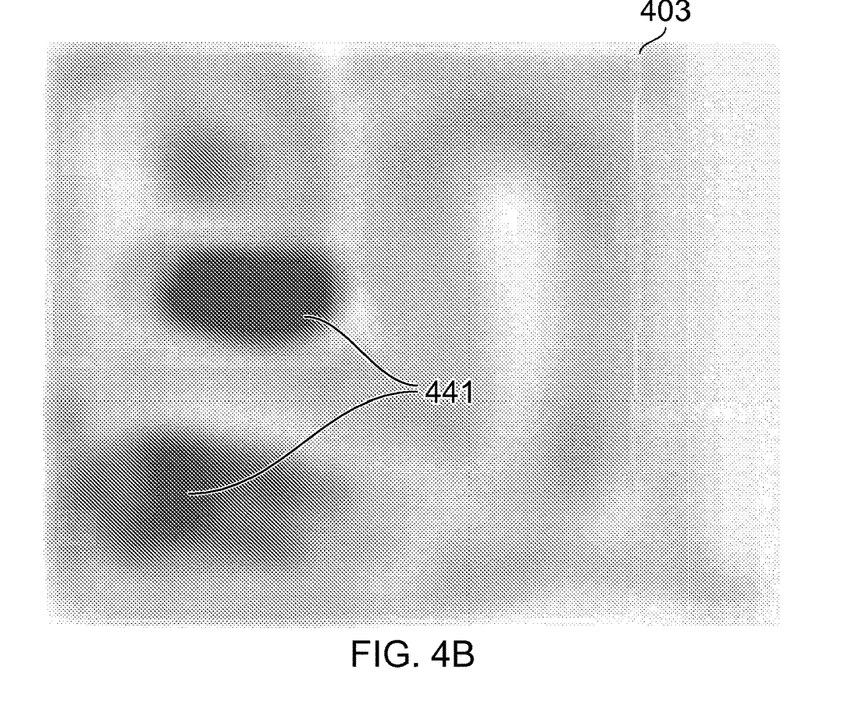

FIGS. 4A and 4B illustrate an example virtual space 401 and sound space 403 that could be used in examples of the disclosure.

The virtual space 401 shown in FIG. 4 represents a living space 411. The living space 411 could comprise part of mediated reality content such as game or other suitable content.

The living space 411 comprises different areas that have different acoustic characteristics. The living space 411 comprises a kitchen 413 and a bathroom 415. The kitchen and bathroom have hard surfaces which make the areas more echoic which increases the effects of reverberation. The bathroom 415 may be tiled to create a very echoic space.

The bedroom 417 and living room 419 may be carpeted and may comprise more soft surfaces which absorb more of the acoustic signals and so create a less echoic environment as compared to the kitchen 413 and bathroom 415.

The living space 411 also comprises a small garden 421 which comprises an outside area. The garden is less echoic than the kitchen 413 and bathroom 415. There may also be audio objects that are audible in the garden 421 that are not audible in the house similarly there may be some audio objects that are audible in the house that are not audible in the garden 421.

In the example of FIG. 4A two users 431 are situated within the virtual space 401. The virtual space 401 may be configured to enable the users 431 to move around within the virtual space 401. For instance, the users 431 can move between the different rooms 413, 415, 417, 419 and the garden 421 of the virtual space 401.

As the users 431 move through the virtual space 401 the users 431 change their location and position relative any audio objects within the virtual space 401. The acoustics of the environment that the user 431 is in also changes. This means, that in order for the sound space to be realistically recreated information relating to the position and direction of the sound objects relative to the users 431 is need and also information relating to the acoustic environment for the user 431. For example if the user 431 is in the tiled echoic bathroom this will provide a different audio environment to the carpeted living room 419.

FIG. 4B shows the sound space 403 that can be represented by the image file generated using examples of the disclosure. It is to be appreciated that the sound space 403 is only recreated visually in FIG. 4B to illustrate the examples of the disclosure. In implementations of the invention the image file that represents the sound space 403 would not be rendered visually. Instead the information from the image file could be decoded and used to audibly recreate the sound space 403.

In the example of FIG. 4B the acoustic parameter that is shown is the reverberation. The reverberation is mapped to the pixels within the image file so that the higher the values of the reverberation have higher intensity values for the pixel. FIG. 4B shows the regions of the virtual space 401 corresponding to the bathroom 415 and the kitchen 413 to have the highest levels of reverberation. These are shown as the darker patches 441 in the image file.

In the example of FIG. 4B the sound space 403 is represented using a grey scale image. In other examples the image file could be a coloured image and different colours within the image could be mapped to the different values of the acoustic parameters.

In some examples when a coloured image file is used the different colour channels could represent different acoustic parameters, for example the red channel could represent reverberation, the green channel could represent direction of arrival and the blue channel could represent level. Other parameters could be used in other examples of the disclosure. In such examples it is not important what the resulting image looks like as this would never need to be rendered to a user. In such examples it might not be possible to identify the different acoustic areas by looking at an image resulting from the image file because this would show the combination of the different colour channels. However, the rendering device 207 would be configured to decode the image file to obtain the acoustic parameters from the different colour channels and use these to enable the sounds space 403 to be audibly rendered.

Figure 5:
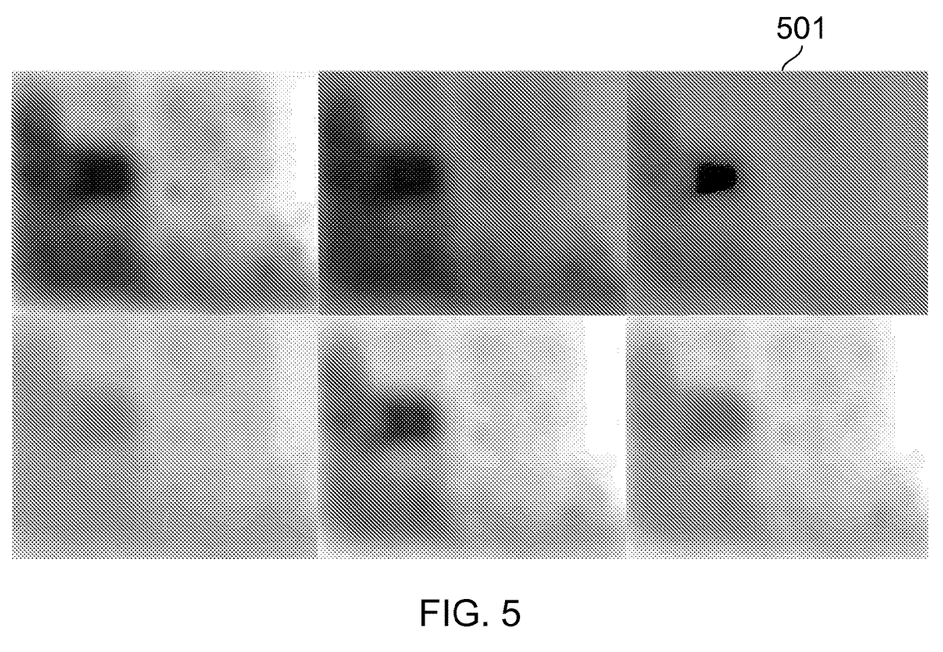
FIG. 5 illustrates an example image file.

FIG. 5 illustrates an example image file 501 that could be generated using examples of the disclosure. In the example of FIG. 5 the image file comprises a greyscale image in which the intensity of the pixel is determined by the value for reverberation for an area corresponding to the pixel.

The image file 501 shown in FIG. 5 comprises six different representations of the sound space 403. The different representations of the sound space 405 correspond to the reverberation for different frequency bands.

The representation of the image files show that, for different frequency bands, the change in the acoustic parameters is smooth which makes the image file 501 suitable to be compressed using image compression processes.

In the example of FIG. 5 the different representations showing the same acoustic parameter at different frequencies are fitted together in a grid to form a combined image file 501. Each of the individual images comprises a 200×160 pixel grey scale image. The individual images are tiled together in a three by two array to form a combined 600×320 pixel grey scale image.

In other examples the different representations could be combined as a sequence of images or a video image file. The use of a sequence of images or a video file could be useful where the virtual space 401 covers a large area.

Figure 6A:
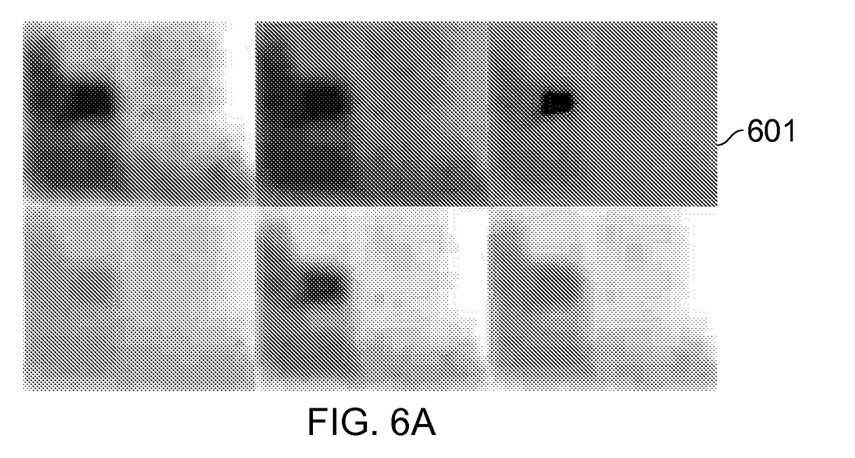
FIGS. 6A to 6C illustrate example image files.
Figure 6B:
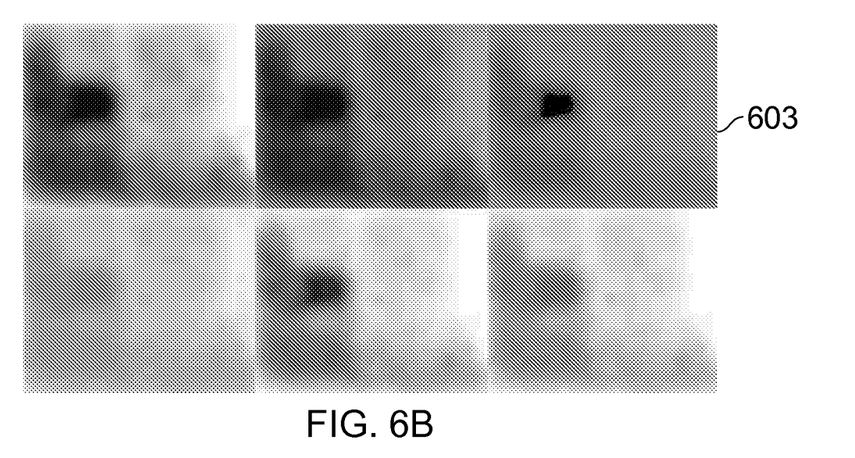
Figure 6C:
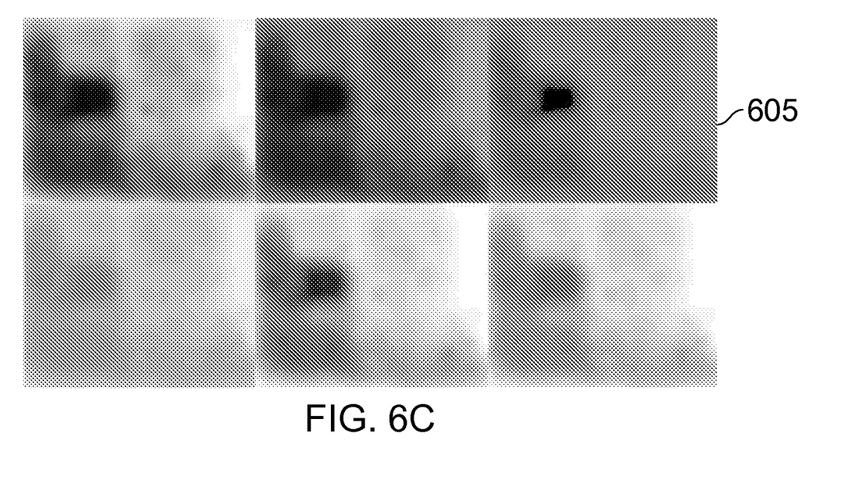

FIGS. 6A to 6C illustrate more example image files 601, 603, 605. Each of the image files 601, 603, 605 shown in FIGS. 6A to 6C relate to the same sound space and acoustic parameters as shown in FIG. 5. However different scaling and compression ratios have been used for each of image files 601, 603, 605.

In the example of FIG. 6A the image file 601 has been scaled to an image with dimension of 600×320 and then compressed with a jpg image coding algorithm to provide resulting image file with a size of 2982 bytes.

In the example of FIG. 6A this level of compression has resulted in coding artifacts such as blocking in the image file 601. However, even with this blocking sufficient information about the acoustic parameters may be retained in the image file 601 to enable the audio signals to be used to render the sound space with sufficient quality.

In the example of FIG. 6B the image file 603 has been scaled to an image with dimension of 600×320 and then compressed with a jpg image coding algorithm to provide resulting image file with a size of 4909 bytes. This produces fewer artefacts in the image file 603 compared to the image file 601 in FIG. 6A.

In the example of FIG. 6C the image file 605 has been scaled to an image with dimension of 600×320 and then compressed with a jpg image coding algorithm to provide resulting image file with a size of 10169 bytes. This resulting image file 605 does not appear to show any artefacts and still has a small file size.

In the example image file 605 of FIG. 6C the 10169 bytes for a 600×320 resolution image files equates to 0.424 bits per value. That is the values for an acoustic parameter, for six different frequency bands within a sound space can be stored for the purposes of audible rendering with 0.424 bits per value. This is a significant reduction compared to raw data values which would be around 192k bytes which is around nineteen times more data.

This is also an even more significant reduction compared to human readable data using a format such as JSON (Java Script Object Notation). A file with x, y, z coordinates and a value for an acoustic parameter for each x, y, z coordinate would require around 80 bytes per acoustic parameter value. For an image file of the sizes as shown in FIGS. 6A to 6C this would result in about 15 Mbytes which is about 1500 times more data than the image file 605 shown in FIG. 6C.

In the examples shown in FIGS. 5 and 6A to 6C the acoustic parameter that is mapped is the reverberation. Other acoustic parameters could also be used in other examples of the disclosure. The following table lists examples of the acoustic parameters that can be mapped to intensity values for pixels and how these values could be mapped. It is to be appreciated that this is a non-exhaustive list and other parameters could be used in other examples of the disclosure.

A similar process used for the arrival time of reflection can also be used for higher order reflections such as the second and third reflections.

It is to be appreciated that other mapping processes could be used in other examples of the disclosure.

Figure 7:
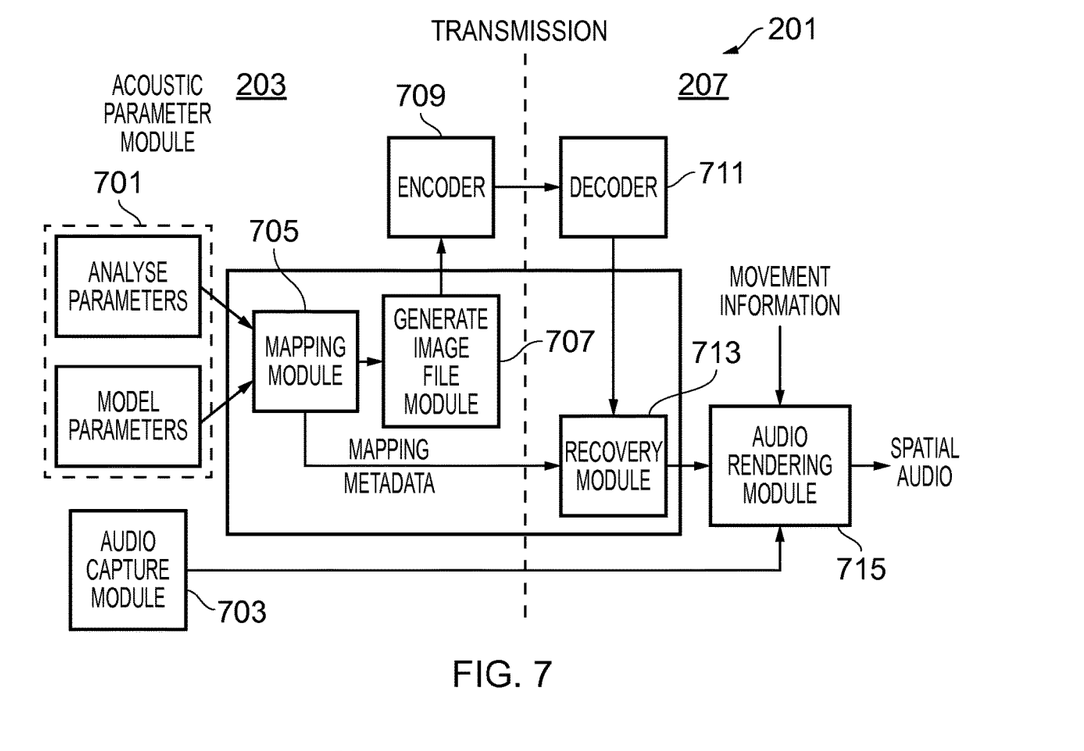
FIG. 7 illustrates an example system.

FIG. 7 illustrates an example system 201 that could be used to implement the examples of the disclosure. The example system 201 comprises a computer 203 and a rendering device 207 which could be as shown in FIG. 2. The computer 203 could comprise an apparatus 101 which could be as shown in FIG. 1 and could be configured to implement methods as shown in FIG. 3.

In the example of FIG. 7 the computer 203 comprises an acoustic parameter module 701. The acoustic parameter module 701 may comprise any means which may be configured to obtain the acoustic parameters. In some examples the acoustic parameters could be obtained by analyzing acoustic signals captured by a plurality of microphones 205. In some examples the acoustic parameters could be obtained from a modelling process. In some examples a combination of analysis and modelling could be used.

The computer 203 may also comprise an audio capture module 703 which may be configured to capture a non-spatial audio signal. The non-spatial audio signal could comprise an audio signal which does not comprise sufficient information to enable a spatial audio to be rendered. For example, where the acoustic parameter that is obtained by the acoustic parameter module 701 comprises reverberation the non-spatial audio signal may comprise a dry audio signal which does not contain any reverberation.

The computer also comprises a mapping module 705. The mapping module 705 is coupled to the acoustic parameter module 701 so that the obtained acoustic parameters can be provided to the mapping module 705.

The mapping module 705 is configured to map the obtained acoustic parameters to pixel values. This may comprises mapping a numerical value for the acoustic

| Acoustic parameters | How to map? |
| --- | --- |
| Audio decay times | Linear mapping of the time from minimum_rt to maximum_rt to [0, 255]. T20 to R, T30 to G, T60 to B. |
| Arrival time of a reflection | Linear mapping of the time with 0 corresponding to the arrival time of direct sound and delay_max the time of the start of the diffuse tail to the interval [0, 255] |
| Horizontal arrival direction of a reflection | Linear mapping of the azimuth range from 0 to 360 degrees to the interval [0, 255] |
| Vertical arrival direction of a reflection | Linear mapping of the elevation range from −90 degrees to 90 degrees to the interval [0, 255] |
| Relative level of a reflection | Linear mapping of the amplitude multiplier compared to the level of direct sound. Maximum value 10, minimum value 0, mapped to the interval [0, 255] |
| Diffuseness | Linear mapping of the ratio from 1 to 0 to the interval [0, 255] |
| Equalization | Using LSF (line spectral frequencies) coefficients or spectrum band gains. |
| direct sound level | Linear mapping of the level from −140 dB to 0 dB to the interval [0, 255] |
| direct sound position | Linear mapping of the level from −140 to 0 dB to the interval [0, 255] |
| late delay | Linear mapping of the time from minimum_rt to maximum_rt to [0, 255]. |
| early reflection latency | Linear mapping of the time from minimum_rt to maximum_rt to [0, 255]. |

In this example the mapping of audio decay times comprises mapping the different decay times to different colour channels. The T20 time is the time it takes for a sound to attenuate to 20 dB from the level of direct sound and the T30 and T60 times are the times it takes for the sound to attenuate to 30 dB and 60 dB respectively from the direct sound.

parameter to a numerical value for the intensity of a pixel. The intensity of the pixel could be a grey scale intensity or could be the intensity of a colour channel.

The computer 203 also comprises an image file generating module 707. The image file generating module is coupled to the mapping module 705 so that the image file generating module 707 obtains the mapping of the acoustic parameters and can used this information to generate an image file.

The image file generating module 707 may also be configured to combine multiple images into a single image file. For instance, in some examples smaller images can be tiled together to form a larger, combined image. In some examples the smaller images could be combined into a video sequence. In some examples larger combined images could be combined into a video sequence.

The image file generating module 707 provides an output comprising an image file. The image file generating module 707 is coupled to an encoder 709 to enable the image file to be encoded and compressed. The image file could be compressed using jpg image compression or any other suitable type of compression.

Information indicative of how the acoustic parameters have been mapped to pixel values could also be provided to the encoder 709 with the image file. This information enables the rendering device 207 to decode the image file and enable the sound space to be rendered. For example the mapping information may indicate the scale of the values of the acoustic parameters, the type of acoustic parameters and any other suitable information.

The compressed image file obtained by the encoder 709 may be transmitted to the rendering device 207. The rendering device 207 could be a headset comprising ear pieces to enable spatial audio to be rendered to a user. Other types of rendering device could be used in other examples of the disclosure.

The rendering device 207 comprises a decoder 711 which is configured to decide the obtained image file. The decoder 711 is coupled to an acoustic parameter recovery module 713. The decoder 711 is coupled to the acoustic parameter recovery module 713 so that the decoded image file can be provided to the acoustic parameter recovery module 713.

The acoustic parameter recovery module 713 may comprise any means which may be configured to recover the acoustic parameters from the image file. In the example of FIG. 7 the acoustic parameter recovery module 713 is also configured to receive the mapping metadata which enables the acoustic parameter recovery module 713 to determine how the values of the intensity of the pixels in the image file should be converted to acoustic parameters.

The acoustic parameter recovery module 713 is coupled to an audio rendering module 715 so that once the acoustic parameters have been recovered they are provided to an audio rendering module 715 to enable an audio signal to be rendered for a user. The audio rendering module 715 may also obtain the non-spatial audio signal which does not comprise the acoustic parameters and may be configured to use the acoustic parameter to adjust the non-spatial audio signal to provide a spatial audio signal.

In some examples the audio rendering module 715 may be configured to receive information about movement of the user. In such examples the acoustic parameters obtained by the acoustic parameter recovery module 713 may be used to adjust the sound scene for the user to correspond to the user's current position. This may enable the user to move within the virtual space while listening to the spatial audio signal. In some examples this may enable the user to move with six degrees of freedom within the virtual space.

Figure 8:
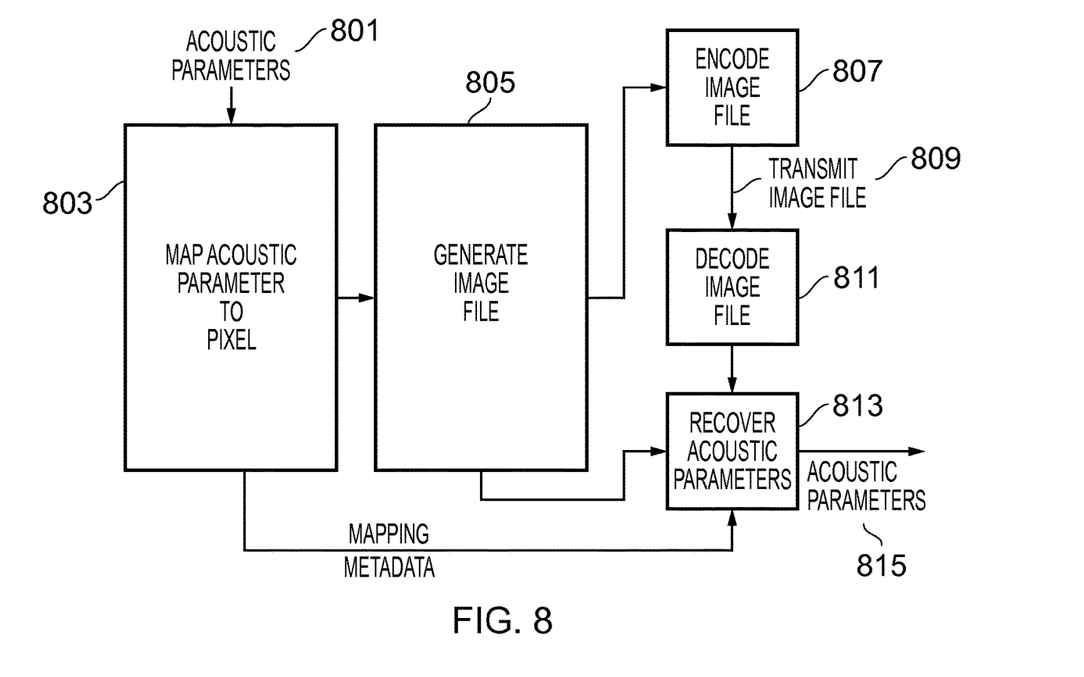
FIG. 8 illustrates an example mapping process.

FIG. 8 illustrates an example mapping process that could be used in some implementations of the disclosure.

The method comprises, at block 801 obtaining the acoustic parameters for a sound space. The acoustic parameters may comprise information for different locations within the sound space so as to enable a user listening to a rendered audio signal to move within the sound space. The different locations may comprise different locations within a horizontal plane and also different location within a vertical plane so as to enable a user to move with six degrees of freedom within the sound space.

At block 803 the obtained acoustic parameters are mapped to an image file. At block 803 mapping metadata which indicates how the acoustic parameters have been mapped to pixel values is also generated. The mapping metadata could contain information relating to the number of acoustic parameters and the type of the acoustic parameters that have been mapped. The mapping data could also contain information about the frequency bands that have been used for the acoustic parameters.

The mapping metadata may comprise information about how the values of the acoustic parameters are mapped to an intensity value for a pixel. For instance, it can indicate the scale used and whether this is a linear or logarithmic scale.

In some examples the mapping metadata may also comprise information which associates a location within the sound space with a pixel location within the image file. This information could include information relating to the position offset, grid resolution, grid size, resolution and any other suitable information. In some examples the mapping metadata could comprise information relating to coordinates at which measurements of the acoustic parameters have been made. This information can be added to image file to indicate that the acoustic parameters are valid between the measurement points. In some examples the values of the acoustic parameters between the measurement points may be interpolated or obtained using other suitable modelling methods.

Where the image file comprises a plurality of images that are combined the mapping metadata may comprise information which indicates how the images have been combined. For instance, where the smaller images have been tiled to form a larger image as shown in FIG. 5 the mapping metadata may indicate the tiling order of the smaller images. Similarly where the smaller images have been combined into sequences or video files the mapping metadata may comprise information about the order in which the images have been arranged.

Where the image file is a colour image file the mapping metadata may comprise information which indicates how each of the colour channels are mapped to an acoustic parameter. For instance, the mapping metadata may comprise information about which acoustic parameter is represented by each of the colour channels.

At block 805 the image file is generated. In some examples the image file can be generated by combining individual images into a combined image. The combined image could comprise an array of tiled images, a sequence of images a video image file or any other suitable combination.

Generating the image file could also comprise mapping the different acoustic parameters to different colour channels so that different acoustic parameters can be represented within the same image file.

At block 807 the image file is encoded. The encoding may also comprise compressing the image file using image compression techniques. Once the image file has been compressed the image file can be transmitted at block 809. The mapping metadata may also be transmitted with the image file.

The image file can be transmitted to a rendering device 207 such as the rendering device 207 shown in FIGS. 2 and 7.

At block 811 the decoder of the rendering device 207 decodes the image file and at block 813 the rendering device recovers the acoustic parameters from the image file. The mapping metadata may be used to recover the acoustic parameters from the image file. At block 813 the recovered acoustic parameters 815 are used to provide as an output signal signal. The recovered acoustic parameters 815 may enable a spatial audio signal to be rendered so as to enable a user to move within the sound space.

Examples of the disclosure therefore enable large volumes of data relating to acoustic parameters to be quantized and arranged into a pixel array and then compressed to reduce the file size. This makes the data relating to the sound space more efficient to store and transmit enables the sound space to be recreated by the rendering device 207. Examples of the disclosure could work with indoor spaces which may have a plurality of different factors affecting the acoustic environment.

As an example, one coloured image file with a resolution of 1024×500 could contain as many as four different acoustic parameters for 24 frequency bands for a normal sized room. This could be compressed to approximately 100 KB without losing the quality of the image. Therefore this enables the information relating to the acoustic parameters to be efficiently retained and used to audibly render the sound space with a high quality.

In this description the term coupled means operationally coupled. Any number or combination of intervening elements can exist between coupled components including no intervening elements.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to 'comprising only one . . . ' or by using 'consisting'.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature) or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
processing circuitry; and
memory circuitry storing instructions that, when executed by the processing circuitry, cause the apparatus at least to:
obtain one or more values for one or more acoustic parameters for a plurality of locations within a sound space, wherein the one or more values are obtained via at least one of:
an analysis of audio signals, or
a modeling process;
generate an image representing the sound space, where an intensity value for a pixel of the image represents a value for an acoustic parameter at a location, of the plurality of locations, corresponding to the pixel such that data in the image enables the sound space to be rendered; and provide the image and mapping data associated with the image, wherein the mapping data is configured to, at least, describe how the plurality of locations within the sound space are mapped to pixels of the image.

2. An apparatus as claimed in claim 1, wherein the memory circuitry stores instructions that, when executed by the processing circuitry, cause the apparatus to:

compress the image using at least one image compression process.

3. An apparatus as claimed in claim 1, wherein the memory circuitry stores instructions that, when executed by the processing circuitry, cause the apparatus to:

cause a plurality of representations of the sound space to be combined in a single image wherein different representations relate to different acoustic parameters.

4. An apparatus as claimed in claim 3, wherein the memory circuitry stores instructions that, when executed by the processing circuitry, cause the apparatus to:

cause the plurality of representations to be provided in a tiled format.

5. An apparatus as claimed in claim 3, wherein the memory circuitry stores instructions that, when executed by the processing circuitry, cause the apparatus to:

cause the plurality of representations to be provided in a video format, and in a tiled format.

6. An apparatus as claimed in claim 1, wherein the image comprises at least one of:

a grey scale image, or a coloured image with different colour channels used to represent different acoustic parameters.

7. An apparatus as claimed in claim 1, wherein the one or more acoustic parameters comprise any one or more of:

reverberation;

audio decay time;

arrival time of reflection;

horizontal arrival direction of reflection;

vertical arrival direction of reflection;

relative level of reflection;

diffuseness;

equalization;

direct sound level;

direct sound position;

late delay; or early reflection latency.

8. An apparatus as claimed in claim 1, wherein the memory circuitry stores instructions that, when executed by the processing circuitry, cause the apparatus to:

associate the mapping data with the image, wherein the mapping data comprises information that enables the image to be converted to the one or more values for the one or more acoustic parameters, wherein the mapping data is further configured to describe how the one or more values for the one or more acoustic parameters are mapped to intensity values for the pixels of the image.

9. An apparatus as claimed in claim 1, wherein the memory circuitry stores instructions that, when executed by the processing circuitry, cause the apparatus to:

generate the image for different heights of the sound space.

10. An apparatus as claimed in claim 1, wherein the sound space is a virtual sound space.

11. An apparatus as claimed in claim 1, wherein the apparatus comprises one or more transceivers configured to transmit the image to an audio rendering device.

12. The apparatus of claim 1, wherein the image is configured to represent the sound space in a first frequency band, wherein the apparatus is further configured to:

generate a further image representing the sound space in a second frequency band, wherein the first frequency band is at least partially different from the second frequency band.

13. The apparatus of claim 1, wherein the data in the image comprises information configured to enable the sound space to be rendered.

14. A method comprising:

obtaining one or more values for one or more acoustic parameters for a plurality of locations within a sound space, wherein the one or more values are obtained via at least one of:

an analysis of audio signals, or a modeling process;

generating an image representing the sound space, where an intensity value for a pixel of the image represents a value for an acoustic parameter at a location, of the plurality of locations, corresponding to the pixel such that data in the image enables the sound space to be rendered; and providing the image and mapping data associated with the image, wherein the mapping data is configured to, at least, describe how the plurality of locations within the sound space are mapped to pixels of the image.

15. A method as claimed in claim 14, wherein the method also comprises compressing the image using at least one image compression process.

16. A method as claimed in claim 14, further comprising causing a plurality of representations of the sound space to be combined in a single image wherein different representations relate to different acoustic parameters.

17. A method as claimed in claim 16, further comprising causing the plurality of representations to be provided in a tiled format.

18. A method as claimed in claim 16, further comprising causing the plurality of representations to be provided in a video format, and in a tiled format.

19. A method as claimed in claim 14, wherein the image comprises at least one of:

a grey scale image, or a coloured image with different colour channels used to represent different acoustic parameters.

20. A non-transitory computer readable medium embodied with a computer program comprising computer program instructions that, when executed with processing circuitry, cause:

obtaining one or more values for one or more acoustic parameters for a plurality of locations within a sound space, wherein the one or more values are obtained via at least one of:

an analysis of audio signals, or a modeling process;

generating an image representing the sound space, where an intensity value for a pixel of the image represents a value for an acoustic parameter at a location, of the plurality of locations, corresponding to the pixel such that data in the image enables the sound space to be rendered; and providing the image and mapping data associated with the image, wherein the mapping data is configured to, at least, describe how the plurality of locations within the sound space are mapped to pixels of the image.

* * * * *